US007920321B2

(12) United States Patent
Saxe et al.

(10) Patent No.: US 7,920,321 B2
(45) Date of Patent: Apr. 5, 2011

(54) SPD FILMS AND LIGHT VALVES INCORPORATING OVERCOATINGS WHICH ENHANCE FILM ADHESION TO SUBSTRATES, HAVE GOOD COHESION AND PROTECT AGAINST ELECTRICAL SHORT CIRCUITS

(75) Inventors: Robert L. Saxe, New York, NY (US); Steven M. Slovak, N. Massapequa, NY (US); Xiao-Ping Chen, Flushing, NY (US)

(73) Assignee: Research Frontiers Incorporated, Woodbury, NY (US)

( * ) Notice: Subject to any disclaimer, the term of this patent is extended or adjusted under 35 U.S.C. 154(b) by 0 days.

(21) Appl. No.: 12/325,532

(22) Filed: Dec. 1, 2008

(65) Prior Publication Data

US 2009/0153944 A1 Jun. 18, 2009

Related U.S. Application Data

(60) Provisional application No. 60/992,881, filed on Dec. 6, 2007.

(51) Int. Cl.
*G02B 26/00* (2006.01)
(52) U.S. Cl. ...................................................... 359/296
(58) Field of Classification Search .................. 359/245, 359/246, 251, 252, 248, 254, 255, 256, 290, 359/296, 322, 323, 585; 252/582, 586; 546/257; 544/347
See application file for complete search history.

(56) References Cited

U.S. PATENT DOCUMENTS

| 5,463,491 | A | 10/1995 | Check, III | |
|---|---|---|---|---|
| 5,812,300 | A * | 9/1998 | Coleman | 359/265 |
| 6,987,602 | B2 | 1/2006 | Saxe | 359/296 |
| 7,180,649 | B2 * | 2/2007 | Morrison et al. | 359/265 |
| 2007/0195401 | A1 | 8/2007 | Slovak et al. | 359/296 |

FOREIGN PATENT DOCUMENTS

| EP | 1 741 681 | 1/2007 |
|---|---|---|
| WO | WO 2007/097796 | 8/2007 |

OTHER PUBLICATIONS

International Search Report and Written Opinion dated Feb. 5, 2009 corresponding tp International patent Application No. PCT/US 08/13249.
Extended European Search Report dated Dec. 1, 2010 in corresponding European Patent Application No. 08855938.0 (Publication No. 2225593).

* cited by examiner

*Primary Examiner* — Ricky L Mack
*Assistant Examiner* — Tuyen Q Tra
(74) *Attorney, Agent, or Firm* — Ostrolenk Faber LLP

(57) ABSTRACT

An electro-optical device, e.g., a suspended particle device (SPD) adapted for controlling the transmission of radiation wherein the device is provided with at least one layer of an overcoating adapted to enhance adhesion on at least a portion of a surface between a film serving as a light modulating element and electrode means for applying an electrical field to said film, wherein the overcoating is formed from a material comprising a member selected from the group consisting of (a) titanium dioxide ($TiO_2$) alone and (b) a combination of $SiO_x$ and an inorganic material having an index of refraction at 589 nm greater than 1.54. A method of producing the device with the application of such overcoating is additionally described.

20 Claims, No Drawings

SPD FILMS AND LIGHT VALVES INCORPORATING OVERCOATINGS WHICH ENHANCE FILM ADHESION TO SUBSTRATES, HAVE GOOD COHESION AND PROTECT AGAINST ELECTRICAL SHORT CIRCUITS

CROSS REFERENCE TO RELATED APPLICATIONS

The present application claims benefit of and priority to U.S. Provisional Patent Application No. 60/992,881 filed Dec. 6, 2007 entitled SPD FILMS AND LIGHT VALVES INCORPORATING OVERCOATINGS WHICH ENHANCE ADHESION TO SUBSTRATES AND PROTECT AGAINST ELECTRICAL SHORT CIRCUITS, the entire contents of which are incorporated by reference herein.

FIELD OF THE INVENTION

The invention is directed to films comprising cured emulsions with liquid particle suspensions distributed therein, that are adapted for use in light valves. Such light valves are generally referred to herein as suspended particle devices or SPD light valves, or simply as SPDs. The films described herein have good cohesion and further comprise an overcoating(s) which adheres well to the cured emulsion component of the film as well as to the electrodes and their underlying substrates. The overcoatings simultaneously eliminate or substantially reduce the chance that an arc-over electrical short circuit will occur between the electrodes of the SPD light valve when a voltage is applied to activate the device.

BACKGROUND OF THE INVENTION

SPD light valves have been known for more than seventy years for use in the modulation of light. Such light valves have been proposed for use in numerous applications during that time including, e.g., alphanumeric displays and television displays; filters for lamps, cameras, displays and optical fibers; and windows, sunroofs, toys, sunvisors, eyeglasses, goggles, mirrors, light pipes and the like to control the amount of light passing therethrough or reflected therefrom as the case may be. Examples of windows include, without limitation, architectural windows for commercial buildings, greenhouses and residences, windows for automotive vehicles, boats, trains, planes and spacecraft, windows for doors including peepholes, and windows for appliances such as ovens and refrigerators including compartments thereof. Light valves of the type described herein are also known, as indicated above, as suspended particle devices or SPDs.

As used herein, the term "light valve" generally describes a cell formed of two walls that are spaced apart by a small distance, with at least one wall being transparent. The walls have electrodes thereon, usually in the form of transparent, electrically conductive coatings. Optionally the electrodes on the walls may have thin transparent dielectric overcoatings thereon. The cell contains a light-modulating element (sometimes referred to as an activatable material) which may, without limitation, be either a liquid suspension of particles, or all or a portion of the entire element may comprise a plastic film in which droplets of a liquid suspension of particles are distributed.

The liquid suspension (sometimes herein referred to as a liquid light valve suspension or as a light valve suspension) comprises small particles suspended in a liquid suspending medium. In the absence of an applied electrical field, the particles in the liquid suspension assume random positions due to Brownian movement. Hence, a beam of light passing into the cell is reflected, transmitted or absorbed depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state.

For many applications it is preferable for all or part of the activatable material, i.e., the light modulating element, to be a plastic film rather than a liquid suspension. For example, in a light valve used as a variable light transmission window, a plastic film in which droplets of liquid suspension are distributed is preferable to a liquid suspension alone because hydrostatic pressure effects, e.g., bulging associated with a high column of light suspension, can be avoided through use of a film and the risk of possible leakage can also be avoided. Another advantage of using a plastic film is that, in a plastic film, the particles are generally present only within very small droplets and, hence, do not noticeably agglomerate when the film is repeatedly activated with a voltage.

A light valve film (also sometimes herein referred to as an SPD film) as used herein means a film or sheet, or more than one thereof comprising a suspension of particles used or intended for use in an SPD light valve. Such light valve film usually comprises a discontinuous phase of a liquid comprising dispersed particles, such discontinuous phase being dispersed throughout a continuous phase enclosed within one or more rigid or flexible solid films or sheets. Cured emulsion, which may be part of a light valve film, is sometimes also referred to as a film or film layer. The light valve film may also comprise one or more additional layers such as, without limitation, a film, coating or sheet or combination thereof, which may provide the light valve film with one or more of, for example, (1) scratch resistance, (2) protection from ultraviolet radiation, (3) reflection of infrared energy, (4) electrical conductivity for transmitting an applied electric or magnetic field to the activatable material, and (5) dielectric overcoatings.

A common (but non-limiting) construction for an SPD film has five layers, namely, from one side to the other: (1) a first sheet of polyethylene terephthalate ("PET") plastic, conveniently 5-7 mils in thickness, (2) a very thin transparent, electrically conductive coating of indium tin oxide ("ITO"), acting or capable of acting as an electrode, on said first sheet of PET, (3) a layer of cured (i.e., cross-linked) SPD emulsion, usually 2-5 mils in thickness and, (4) a second ITO coating acting or capable of acting as an electrode on (5) a second PET plastic substrate. As stated above, additional layers which provide other functions may optionally be added to the five-layer SPD film described above. Furthermore the SPD film can be laminated, for example, with transparent hot melt adhesive films and/or glass or thicker transparent plastic sheets to provide strength and rigidity and to protect various parts of the combined unit from environmental stresses which may, otherwise, damage its performance characteristics.

U.S. Pat. No. 5,409,734 exemplifies a type of non-cross-linked light valve film that is made by phase separation from a homogeneous solution. Light valve films made by cross-linking (curing) of emulsions are also known. The methods of the present invention are specifically directed to the use of the latter type of film, i.e., film comprising a layer formed by cross-linking an emulsion, and to laminated films produced thereby. See, for example, U.S. Pat. Nos. 5,463,491 and 5,463,492, and published U.S. Patent Application No. 2005/

0227061 (published Oct. 13, 2005), all of which are assigned to the assignee of the present application. Various types of SPD emulsions, and methods of curing the same, are described in U.S. Pat. Nos. 6,301,040, 6,416,827, and 6,900,923 B2, all of which are assigned to the assignee of the present application. Such films and variations thereof may be cured through cross-linking brought about by exposing the films to (1) ultraviolet radiation, (2) electron beams or (3) heat. Each of the patents/patent applications and other references cited in this application are specifically incorporated herein by reference.

A variety of liquid light valve suspensions are well known in the art and such suspensions are readily formulated according to techniques well-known to one of ordinary skill therein. The term liquid light valve suspension, as noted above, when used herein means a liquid suspending medium in which a plurality of small particles are dispersed. The liquid suspending medium comprises one or more non-aqueous, electrically resistive liquids in which there is preferably dissolved at least one type of polymeric stabilizer which acts to reduce the tendency of the particles to agglomerate and to keep them dispersed and in suspension.

Liquid light valve suspensions useful in the present invention may include any of the so-called prior art liquid suspending media previously proposed for use in light valves for suspending the particles. Liquid suspending media known in the art which are useful herein include, but are not limited to, the liquid suspending media disclosed in U.S. Pat. Nos. 4,247,175, 4,407,565, 4,772,103, 5,409,734, 5,461,506, 5,463,492, and 6,936,193 B2, the disclosures of which are incorporated herein by reference. In general one or both of the suspending medium or the polymeric stabilizer typically dissolved therein is chosen so as to maintain the suspended particles in gravitational equilibrium.

The polymeric stabilizer, when employed, can be a single type of solid polymer that bonds to the surface of the particles, but which also dissolves in the non-aqueous liquid(s) which comprise the liquid suspending medium. Alternatively, there may be two or more solid polymeric stabilizers serving as a polymeric stabilizer system. For example, the particles can be coated with a first type of solid polymeric stabilizer such as nitrocellulose which, in effect, when dissolved, provides a plain surface coating for the particles, together with one or more additional types of solid polymeric stabilizer that when dissolved, bond to or associate with the first type of solid polymeric stabilizer and also dissolve in the liquid suspending medium to provide dispersion and steric protection for the particles. Also, liquid polymeric stabilizers may be used to advantage, especially in SPD light valve films, as described for example in U.S. Pat. No. 5,463,492.

Inorganic and organic particles may be used in a light valve suspension, and such particles may be either light absorbing or light reflecting in the visible portion of the electromagnetic spectrum.

Conventional SPD light valves have generally employed particles of colloidal size. As used herein the term colloidal means that the particles generally have a largest dimension averaging 1 micron or less. Preferably, most polyhalide or non-polyhalide types of particles used or intended for use in an SPD light valve suspension will have a largest dimension which averages 0.3 micron or less and more preferably averages less than one-half of the wavelength of blue light, i.e., less than 2000 Angstroms, to keep light scatter extremely low.

More specifically with regard to the present invention, for many years, SPD light valve experts have known that a light valve cell may be constructed either with or without the cell's electrodes being in direct contact with the activatable material (i.e., a liquid suspension or a film). For example, in U.S. Pat. No. 3,655,267 (Forlini), assigned to the assignee of the present invention, in Column 1, lines 34-44 the specification reads as follows: "To apply an electric field to the suspension, conductive area electrodes are provided on a pair of oppositely disposed walls of the cell, and an electric potential applied thereto. The electrodes may be thin transparent coatings on the inner sides of the front and rear walls of the cell, thereby forming an ohmic type cell wherein the electrodes are in contact with the fluid suspension. It has also been suggested to cover the electrodes with a thin layer of transparent material such as glass in order to protect the electrodes. Such thin layers of glass form dielectric layers between the electrodes and the fluid suspension, and the cells may be termed 'capacitive cells'." Such dielectric coatings, if used, could prevent or reduce any migration of contaminants into the fluid suspension from either the walls of the cell or from the electrodes themselves, in addition to furnishing protection from a possible arc-over short circuit between electrodes in the event too high a voltage was applied to activate the cell or an unplanned voltage spike occurred from the power supply. As used herein the term "arc-over short circuit" means a short circuit in a light valve cell which is caused or accompanied by an electrical discharge from one electrode to the other electrode of the cell when the light valve is activated by a voltage. For cells wherein a light valve film is the activatable material, an arc-over short circuit may burn the cured emulsion and/or one or both electrodes, and may cause the cured emulsion to delaminate from one or both electrodes.

Early prior art glass dielectrics, although not limited to a particular thickness, were usually glass sheets having a thickness, because of their fragility, of many mils. One mil equals 0.001 inch or about 25.4 microns and one micron equals 10,000 Angstroms. In comparison, the overcoatings of the present invention could be any effective and convenient thickness, without limitation, such as from 10 Angstroms up to 50,000 Angstroms, although thicknesses above 1,000 Angstroms in some cases may absorb too much light and thicknesses above 10,000 Angstroms may be expensive to deposit, whereas thicknesses below 10 Angstroms, while useable, may not be sufficiently uniform over a large area substrate. In general, however, overcoatings were infrequently used in the prior art when fluid suspensions were the activatable material because it requires an extra step and expense in constructing such SPD devices, and because arc-over short circuits were rarely observed when fluid suspensions were used.

At the time U.S. Pat. No. 3,655,267 was issued, i.e., Apr. 11, 1972, SPD devices used fluid suspensions as their activatable material, and films for SPD devices had not yet been invented. Therefore, at that time the adhesiveness of the dielectric overcoatings was not relevant. However, now that films are generally used as the activatable material in SPDs the situation has changed, because it is now desirable for the film (i.e., the cured emulsion) to bond strongly to the coatings with which it is in contact in order to reduce or eliminate the chance of the film layer delaminating from the coatings and their underlying substrates. The lamination of SPD films with other glass and/or plastic sheets and films has also increased the opportunity for short circuits to occur if there are no overcoatings on the electrodes because relatively high temperatures in combination with pressures higher than atmospheric pressure generally used during the lamination procedure soften the film layer of the SPD film and can cause it to ooze beyond the pre-lamination area of the film. This sometimes creates gaps between the electrodes which can enable arc-over short circuits to occur when the SPD film is activated.

Deficiencies of Prior Art SPD Films

Several benefits of using a film as the activatable material for an SPD light valve have been discussed above. However, prior art films also had some significant deficiencies. For example, in prior art films of the type known as poly(organosiloxanes), if the layer of cured emulsion therein bonds only weakly to substrates such as the indium tin oxide ("ITO") coatings generally used as electrodes on the plastic sheets of PET, and is subjected to shear and/or other kinds of forces that could result from any of a variety of sources such as but not limited to changes in temperature or pressure, collisions or vibrations, the cured emulsion layer can easily delaminate from one or both ITO coatings, which will often destroy the appearance and proper functioning of the SPD film.

After sandwiching an uncured layer of SPD emulsion, as disclosed in U.S. Pat. No. 6,900,923 B2, comprising a matrix polymer and a substantially immiscible liquid suspension in between two ITO-coated PET sheets, the sandwiched materials are then exposed to UV radiation to cure the emulsion and form a film. If the emulsion layer is well cured, it has been observed to be bonded to the ITO-coated PET substrates, but the bond strength is, however, weaker than may be desired. For those applications utilizing an SPD device comprising such a film, which are not subject to severe environmental stresses, the adhesion of the cured emulsion to the ITO-coated PET may suffice. However, for applications that may involve severe environmental stress, greater adhesion is desirable and may in fact be required for long-term viability. If the adhesion of a cured emulsion to a substrate is insufficient, what one generally observes is a visually objectionable non-uniform area or areas in the film, which non-uniformity results from delamination of cured emulsion from the adjacent coating(s) and related substrate or substrates.

Another deficiency of prior art SPD films is that during the process of lamination (whereby the SPD film is combined in a stack with other plastic and/or glass films or sheets), when the ambient temperature is increased to a relatively high level the film layer may ooze outside its non-laminated area. Such oozing may allow a partially empty gap to form between the electrodes near the outer edges of the film, which gap may possibly contain air which may have moisture therein, any of which, i.e., the gap, air or moisture, or a combination thereof, may be responsible for electrical short circuits when the film is activated. When such short circuits occur, they are often accompanied by an electrical arc between the electrodes on opposite sides of the film layer, which sometimes causes film to delaminate, which, as stated above, can destroy the appearance and proper functioning of the SPD film.

An SPD film in which the cured emulsion adheres relatively strongly to the ITO-coated PET substrates and also has good cohesion, as in the present invention, is especially useful because such improved adhesion and cohesion make it possible to roll up such manufactured films, which facilitates the shipment of substantial quantities of manufactured SPD film to destinations all over the world, and could enable the SPD film to be used in an application such as a roll-up type of shade. Moreover, it is also important to substantially reduce, or eliminate if possible, the oozing of the film (i.e., the activatable material) during lamination and the chance of an arc-over electrical short circuit occurring between the film electrodes when the SPD is activated with a voltage.

SUMMARY OF THE INVENTION

A film such as, but not limited to, the typical five-layered SPD film structure described above, is modified by overcoating the electrodes (formed, e.g., of ITO) therein with an overcoating comprising either (1) titanium dioxide ($TiO_2$) alone or (2) a combination of $SiO_x$ and an inorganic material having an index of refraction ($n_D$) measured herein at 25° C. and at 589 nm higher than the index of refraction of $SiO_2$, such as but not limited to $TiO_2$. The value of $n_D$ for $SiO_2$ is approximately 1.54 and the value of $n_D$ for $TiO_2$ is approximately 2.61, according to the *CRC Handbook of Chemistry and Physics*, $87^{th}$ Edition, Section 10, Pages 246 to 249. A list of some other inorganic crystalline compounds and their indices of refraction are set forth on those pages and is included herein by reference; an abbreviated list therefrom of inorganic compounds which have a value of $n_D$ at 589 nm higher than 1.80 is set forth in Table 1 herein. The value of 1.80, which is not to be construed as limiting, was selected in order to ensure that the index of refraction is as high as the minimum value of the index of refraction of indium tin oxide. The index of refraction is preferably, but not necessarily less than or equal to about 3.5.

TABLE 1

| Compound | Index of Refraction At 589 nm |
|---|---|
| AgCl | 2.0668 |
| BaO | 1.9841 |
| $BaTiO_3$ | 2.4405 |
| $BaWO_4$ | 1.8426 |
| CaO | 1.8396 |
| $CaWO_4$ | 1.9195 |
| CdS | 2.507 |
| CdSe | 2.525 |
| CuBr | 2.117 |
| CuCl | 1.9727 |
| $Gd_2O_3$ | 1.96 |
| HgS | 2.9413 |
| $KIO_3$ | 1.8317 |
| $KnbO_3$ | 2.2480 |
| LiI | 1.955 |
| $LiIO_3$ | 1.8875 |
| $LiNbO_3$ | 2.3007 |
| $LiTaO_3$ | 2.2116 |
| $Lu_2O_3$ | 1.9349 |
| $Nd_2O_3$ | 1.92 |
| $PbSO_4$ | 1.8780 |
| $SbO_3$ | 2.8017 |
| $Sc_2O3$ | 1.9943 |
| $SnO_2$ | 1.993 |
| $SrTiO_3$ | 2.4082 |
| $SrWO_4$ | 1.8618 |
| $TeO_2$ | 2.2738 |
| $ThO_2$ | 2.1113 |
| TlBr | 2.418 |
| TlCl | 2.247 |
| $Tl_2SO_4$ | 1.8604 |
| $Y_2O_3$ | 1.930 |
| $Yb_2O_3$ | 1.9468 |
| ZnO | 2.0036 |
| ZnS | 2.3691 |
| ZnSe | 2.6222 |
| ZnTe | 3.060 |
| $ZrSiO_4$ | 1.9255 |

As used herein the term "$SiO_x$" means a compound that is 'primarily' constituted of $SiO_2$ (containing a preponderance, i.e., $\geq 50\%$ of $SiO_2$) but which may additionally comprise some SiO as well as trace amounts of other metal oxides. The value of "x" in the aforesaid formula can vary between about 1.6 and 2.0 but in the tests described herein the value (of X) was approximately 1.8. SPD films incorporating such overcoatings used in the tests described herein consequently usually had seven layers instead of five, although, because of the numerous possible overcoatings and constructions and functions of a light valve film, there is no specific limit to the number of layers that an SPD film may have.

Initially a number of such seven-layered SPD films with gradually increasing thicknesses of an overcoating comprising just $SiO_x$ were constructed. All of the overcoated PET substrates described herein were coated with ITO, which had an electrical resistivity of 300 ohms per square or higher but could have any convenient resistivity, and were supplied by either Sheldahl (Northfield, Minn.), now known as Multek Flexible Circuits, Inc.; or Genvac Aerospace (Cleveland, Ohio).

In addition, the cohesion of the film is improved by incorporating approximately 2-6% by weight of a cross-linkable monomer in the matrix polymer of the emulsion which, when cured, becomes the activatable material. A preferred cross-linkable monomer for use in the present invention is (3-acryloxypropyl)methyldimethoxy silane. Prior art films generally used less than 1.6% of such monomer in the matrix polymer.

EXAMPLES

The following examples are provided only for the purpose of illustrating the invention. They are, thus, not to be construed as limiting the invention in any manner.

Example 1

Using seven-layered SPD films as described above with an overcoating of $SiO_x$ on each electrode, the first film tested had an overcoating thickness of approximately 50 Angstroms. The $SiO_x$-overcoated, ITO-coated PET substrates were supplied to by Sheldahl, which advertises such coatings as having greater adhesion than ITO-coated substrates like PET would have without the SiOx overcoating. Hence, the use of $SiO_x$ overcoatings on ITO electrodes to enhance adhesion is public knowledge. However, as far as is known, the articles and methods described herein are the first to use such overcoatings to enhance adhesion in SPD light valves. Moreover the resultant article, as described herein, which either requires a combination of $SiO_x$ with other inorganic material in the overcoatings in order to obtain a superior SPD light transmission range in comparison to using $SiO_x$ alone, or alternatively an overcoating of $TiO_2$ only, is entirely novel and thus is not known in the prior art to increase adhesion between cured emulsion and the adjacent substrates of a SPD cell.

Prior to forming the aforesaid seven-layered film the resistivity of one of the $SiO_x$-overcoated ITO-coated PET substrates was measured and found it to be only about 400 ohms per square. It was confirmed that after forming an SPD film therewith (by curing an emulsion therein), that the film layer therein was much more strongly bonded to the overcoatings than the film was bonded to ITO coatings in an identical SPD film formed in a cell which had no $SiO_x$ overcoatings, i.e., a cell in which the cured emulsion was in direct contact with the ITO electrodes. This was qualitatively determined by prying apart the plastic substrates of the SPD film after curing the film layer therein. Through extensive experience it has been learned that if the cured emulsion bonds only weakly to the ITO coatings, then when the substrates are pried apart one generally observes all or most of the cured emulsion adhering to only one of the two ITO electrodes of that cell, and, nearly always, the electrode to which the cured emulsion adhered was the electrode on which the uncured emulsion was coated. On the other hand, if the cured emulsion bonds relatively strongly to the ITO electrodes, then when the substrates are pried apart the cured emulsion divides so that a portion of the film adheres to each of the two ITO electrodes. This knowhow has been obtained through experiments described in U.S. patent application Ser. No. 11/559,537 which was published on Aug. 23, 2007 under Publication No. US 2007/0195401 A1. which improves upon prior art matrix polymers and films such as, without limitation, those described in U.S. Pat. No. 6,900,923 B2, both of which are assigned to the assignee of the present application.

In order to better comprehend the article and method described herein, it will be useful to briefly review the recent prior art relating to this area of technology.

U.S. Pat. No. 6,900,923 B2 entitled "Siloxane Matrix Polymers and SPD Light Valve Films Incorporating Same," discloses exemplary films suitable for use as a light-modulating unit of an SPD light valve. The article and method described herein is not, however, limited to the specific materials or indices of refraction disclosed in the patent. The film disclosed by the '923 patent comprises a liquid cross-linkable siloxane matrix polymer which has a refractive index >1.4630 and may comprise the main part of an emulsion which, after curing, forms a film layer having droplets of a liquid light valve suspension distributed within the cross-linked matrix. Example 1 of U.S. Pat. No. 6,900,923 B2 discloses a method for synthesizing such a matrix polymer. Briefly stated, that matrix polymer is synthesized in the presence of an appropriate solvent and catalyst by performing a condensation polymerization whereby disilanol-terminated dimethyl diphenyl siloxane oligomer, commonly referred to as "copodisilanol", is copolymerized with 3-acryloxypropylmethyl dimethoxy silane, which is a monomer capable of cross-linking the matrix polymer after exposure to ultraviolet ("UV") radiation, preferably in the presence of a photoinitiator such as Irgacure 819 made by Ciba Specialty Chemicals of Tarrytown, N.Y. After the copolymer is formed, it undergoes endcapping, isolation and purification procedures through use of appropriate materials, solvents and equipment in a manner described therein. As would be well understood by one skilled in this art, endcapping a polymer chain can be accomplished by reacting all or substantially all reactive terminal silanol groups in polymer chains with a compound having one functional group, such as trimethylmethoxysilane.

In Published U.S. Patent Application No. 2007/0195401 A1 entitled "SPD Light Valves Incorporating Films Comprising Improved Matrix Polymers And Methods For Making Such Matrix Polymers" it is shown that by incorporating an adhesive monomer in the structure of the matrix polymer of an SPD emulsion, such as but not limited to those described in U.S. Pat. No. 6,900,923 B2, one can increase the adhesion of the cured film to the ITO electrodes of a light valve cell. The adhesive monomer may be, for example, (3-glycidoxypropyl) methyl dimethoxysilane or an oligomer of (3-glycidoxypropyl) methyl dihydroxysilane, without limitation. When the substrates of an SPD film incorporating a matrix polymer which comprises such an adhesive monomer are peeled apart, the cured emulsion is shown to remain on both substrates, and this qualitative conclusion of increased adhesion was quantitatively confirmed by measuring the force, in P.S.I., required to separate the ITO-coated PET substrates by using the PosiTest AT Adhesion Tester (manufactured by DeFelsko Corp., Ogdensburg, N.Y.) in accordance with ASTM D4541. Although no such adhesive monomer is required to achieve the results obtained with the presently-described method and article, it is, of course, within the scope of the present invention to combine such method and article with other adhesion-increasing methodologies such as those described in U.S. Patent Publication No. 2007/0195401 A1.

Example 2

In order to test the ability of the overcoating as described herein to act as a dielectric layer, the uncured emulsion was applied to a substrate overcoated with $SiO_x$ by depositing a thick bead of emulsion at each side of the substrate and a much thinner bead of emulsion in between them, all on one end of the substrate. Then, using a doctor blade, the emulsion was spread over the whole substrate. However, because of the small amount of emulsion in the center bead, it ran out quickly, leaving a gap or gaps in part of the SPD film after a second substrate is sandwiched with the first substrate and the emulsion is cured with ultraviolet radiation. After attaching connectors from a power supply to both ITO electrodes in the film, a voltage of 100 volts was applied at 60 Hertz and at 400 Hertz to determine if the SPD film can be "opened" when activated. In the case of the SPD film described in EXAMPLE 1 a normal opening was observed when the film was activated. Despite the presence of gaps in the film, no arc-over short circuit and no short circuit (without arc-over) occurred. However, it was also noted that the light transmission range of an SPD film in an identical light valve cell without the $SiO_x$ overcoatings on its ITO electrodes ranged from about 1% to 51%, whereas the range of the film in the light valve cell which incorporated the $SiO_x$ overcoatings was only from about 1% to 41%, i.e., about 10 percentage points less.

In order to enable electrical power to be supplied to the SPD films described herein, it is generally advisable, when overcoating the ITO of an ITO-coated PET substrate with relatively thick overcoatings, to not overcoat all of the ITO, but instead to leave strips which are about ⅛ inch to ½ inch wide which are not overcoated running along part or all of both sides of the ITO coating so that electrical connectors can be attached to the electrodes.

Also, one can offset the two $SiO_x$-overcoated ITO-coated PET substrates so that it is easy to attach electrical connectors to the unovercoated portions of the two facing ITO coatings of the SPD film. The same type of deletions of part of the overcoatings would also be desirable if the overcoating is a material other than $SiO_x$ alone.

Examples 3-5

EXAMPLE 2 was repeated but using three other SPD films in cells which incorporated ITO-coated PET substrates having overcoatings of $SiO_x$ with thicknesses of $SiO_x$ of approximately 250 Angstroms, 500 Angstroms and 1,000 Angstroms respectively. Results were essentially the same as for EXAMPLES 1 and 2.

While not wishing to be bound by theory, it was concluded that the reduced light transmission ranges observed in EXAMPLES 2-5 were probably caused by the fact that $SiO_2$, which comprises most of the $SiO_x$ overcoating, has an index of refraction ($n_D$) of only about 1.54 at 589 nm (nanometers) in comparison with a higher index of refraction for indium tin oxide (ITO) of 1.80 to 2.0 depending on various parameters. It was decided to test this theory by obtaining an inorganic material which would be transparent in a thin layer and which had an index of refraction larger than the $n_D$ of 1.54 for $SiO_2$. A list of inorganic crystalline compounds and their indices of refraction are set forth in the *CRC Handbook of Chemistry and Physics*, $87^{th}$ Edition, in Section 10 Pages 246-249, incorporated herein by reference. Although numerous materials on the list had a value of $n_D$ higher than 1.54, titanium dioxide, $TiO_2$, was selected because it is commonly available. Its $n_D$ at 589 nm is 2.61.

Example 6

In combining $SiO_x$ and $TiO_2$ in various proportions and depositing each such combination as an overcoating, the idea was to prevent any significant loss of light transmission range for a film in a light valve cell with two such overcoatings, i.e., one such overcoating on each electrode, compared to the range for an identical film and cell without overcoatings, when each type of cell was activated. Also, it was hoped that the combination overcoatings would still provide improved adhesion between the film, i.e., the cured emulsion, and the overcoatings, compared to the adhesion between ITO coatings (without overcoatings), similar to the good adhesion which was demonstrated for $SiO_x$ overcoatings in EXAMPLES 2-5.

Also, an effort was made to determine if overcoatings of just $TiO_2$ on the ITO electrodes would be more adhesive than unovercoated ITO electrodes with respect to an adjacent layer of cured emulsion in a light valve cell. Surprisingly, it was found that when EXAMPLE 1 was repeated, but with a layer of $TiO_2$ alone used as the overcoating on each electrode instead of $SiO_x$, the cured emulsion bonded strongly to the $TiO_2$ overcoatings, and when the PET substrates were pried apart, cured emulsion went to both overcoatings, a sign of the strong bonding, and similar to what had been observed in EXAMPLE 1 when the overcoatings were formed of $SiO_x$ alone. However, in the case of $TiO_2$ overcoatings, it was also found that there was virtually no change in the light transmission range of the cell made with $TiO_2$ overcoatings in comparison to a corresponding SPD cell having no overcoatings.

TABLE 2 sets forth the performance of SPD films in cells made with substrates having overcoated ITO electrodes compared to the performance of identical films in control cells having ITO electrodes with no overcoatings. The overcoatings tested include $SiO_x$ alone, a combination of $SiO_x$ and $TiO_2$, $TiO_2$ alone, and $TiO_2$ on both sides of each substrate.

TABLE 2

Performance of SPD Films in Cells made with Substrates Having Overcoated ITO Electrodes Compared to Performance of Identical Film in a Control Cell with no Overcoatings

| Coating | Percent Transmittance | Resistivity Ohms/sq. | Delta T vs Control Cell at 20° C. | Maximum Force Needed to Separate Film with Overcoatings (Newtons/25 mm) | Maximum Force Needed to Separate Film without Overcoatings (Newtons/25 mm) | Delta Force |
|---|---|---|---|---|---|---|
| Control Cell | 86.12 | 300 | | | | |
| Genvac#1 | 87.59 | 507 | −12T@400 Hz, −12T@60 Hz | 1.4 | 0.86 | 0.54 |
| Genvac#2 | 84.26 | 588 | 0T@400 Hz, −1T@60 Hz | 2.37 | 2.2 | 0.17 |

TABLE 2-continued

Performance of SPD Films in Cells made with Substrates Having Overcoated ITO Electrodes
Compared to Performance of Identical Film in a Control Cell with no Overcoatings

| Coating | Percent Transmittance | Resistivity Ohms/sq. | Delta T vs Control Cell at 20° C. | Maximum Force Needed to Separate Film with Overcoatings (Newtons/25 mm) | Maximum Force Needed to Separate Film without Overcoatings (Newtons/25 mm) | Delta Force |
|---|---|---|---|---|---|---|
| Genvac#3 | 87.3 | 535 | OT@400 Hz, −2T@60 Hz | 2.42 | 2.07 | 0.35 |
| Genvac#4 | 84.35 | 446 | −2T@400 Hz, −2T@60 Hz | 2.3 | 1.99 | 0.31 |
| Genvac#5 | 81.69 | 373 | −1T@400 Hz, −1T@60 Hz | 2.24 | 1.84 | 0.4 |

Coating ID
Genvac#1 1000 A° thick layer of SiOx on 1000 ohm/sq. ITO
Genvac#2 1000 A° thick layer of TiO$_2$ on 300 ohm/sq. ITO
Genvac#3 1000 A° thick layer of (TiO$_2$/SiOx)(70%/30%) on 300 ohm/sq. ITO
Genvac#4 10 A° thick layer of TiO$_2$ on both sides of a substrate, having an electrode of 300 ohm/sq. ITO on only one side (the inner side) of each substrate.
Genvac#5 50 A° thick layer of TiO$_2$ on both sides of a substrate, having an electrode of 300 ohm/sq. ITO on only one side (the inner side) of each substrate.
Note:
In all cases the overcoatings described were applied on both electrodes of each film sample. In the case of Genvac#4 and Genvac#5 the TiO$_2$ overcoatings were also applied to the side of the PET substrate that had no ITO electrode.

In Table 2 the data show that for the overcoating designated as Genvac #1, the SPD film lost 12 percentage points of light transmission (compared to the control cell) when activated at either 400 Hertz or at 60 Hertz, although adhesion was increased (Delta Force) by 0.54 Newtons per 25 mm. In the cases of Genvac #2-5, adhesion was increased in all cases by the overcoatings, and light transmission was either unchanged or decreased only 1 or 2 percentage points when the films were activated.

It is important to note that in the examples listed in Table 2 the maximum force needed to separate film that does not have an overcoating on its electrodes varies from a low of 0.86 to a high of 2.2 Newtons per 25 mm, depending on the example. Other unovercoated SPD films, not listed in Table 2, have been tested, for which the maximum force needed has been as low as 0.44 Newtons per 25 mm. The percent increase in the maximum force needed to separate a film whose electrodes are overcoated according to the present invention compared to the same film in cells whose electrodes are not overcoated is therefore likely in many instances to be much greater if the maximum force needed to separate the unovercoated electrode film is relatively low. However, regardless of the percent increase, the factors of greatest importance in establishing strong adhesion are considered to be (1) a relatively high absolute value of the maximum force needed to separate the film when its electrodes are overcoated and (2) the transfer of film to both of the substrates having overcoated electrodes when the film is separated.

The measurements of force performed for the examples listed in Tables 2 and 3 herein were conducted using an EZ Test-S Compact Table-Top Universal Tester sold by Shimadzu Scientific Instruments through their office at 7102 Riverwood Drive, Columbia, Md. 21046.

Table 3 (below) demonstrates that the adhesion was improved in comparison to the values shown in Table 2 by using an emulsion comprising a matrix polymer comprising an adhesive monomer in a film in a control cell without any overcoating, but was further improved when the Genvac #5 overcoatings were also used.

It was noted above that prior art SPD films generally used less than 1.6% of the cross-linkable monomer in the matrix polymer of said films, but that one could substantially improve the cohesion of such films if one increased that percentage to approximately 2-6% by weight of the matrix polymer. The matrix polymers did not comprise any adhesive monomer such as has been described in Published U.S. patent application No. 2007/0195401 A1 prior to the invention thereof. It should be noted, however, that in U.S. Patent Application Publication No. 2007/0195401, Example 4, a method is described for increasing the reactivity of the cross-linkable monomer of the matrix polymer by hydrolyzing it prior to synthesizing the matrix polymer. Said method can be used to increase the cohesion of any matrix polymer and film comprising such matrix polymer regardless of whether or not the matrix polymer comprises an adhesive monomer. The method of hydrolysis is set forth in Example 7 below.

Example 7

Hydrolysis of (3-acryloxypropyl)methyldimethoxy silane
Into a three-necked round bottom flask having a capacity of 250 ml equipped with a thermometer, condenser and magnetic stirring bar, are charged 5.0 g of distilled water, 0.1 g of acetic acid, 30 ml of ethanol and 40.0 g of the cross-linkable monomer, i.e., (3-acryloxypropyl)methyldimethoxy silane. With stirring, the mixture is heated and refluxed at around 60-65° C. for 4 hours. Volatile components including water, acetic acid and ethanol are then removed at 60° C. under reduced pressure and a colorless and clear liquid product is obtained. The weight of the final product is 37.5g. FT-IR of the product shows the occurrence of the hydrolysis of monomer and formation of some small sized oligomer:siloxane (Si—O—Si), 980, 1060, 1190 cm$^{-1}$; silanol (OH): 3450 cm$^{-1}$.

TABLE 3

SPD Films made with Adhesive Matrix Polymer

| Coating | Average Force (Newtons/25 mm) |
|---|---|
| Average of six control cells | 2.795 |
| Average of two cells having Genvac#5 overcoatings | 3.23 |

Coating ID
Genvac#5 50 A° thick layer of TiO$_2$ on both sides of each of two substrates; However, there is an electrode of 300 ohm/sq. ITO on only one side (the inner side) of each substrate.

In the previous EXAMPLES the SPD cell electrodes have been comprised of ITO, i.e., indium tin oxide. However, it should be appreciated that the method described herein can be used with good effect even if the electrode material were changed. Other materials known in the art which could be used as electrodes in place of ITO include, without limitation, the materials listed in Table 4 below.

TABLE 4

Transparent Conductors Useful As Electrodes

Ag by chemical-bath deposition
$SnO_2$: Sb by spray pyrolysis
$SnO_2$: Cl by spray pyrolysis
$SnO_2$: F by spray pyrolysis
$In_2O_3$: Sn by spray pyrolysis
$In_2O_3$: Sn by sputtering
$SnO_2$: Sb by chemical vapor deposition (CVD)
$Od_2SnO_4$ by sputtering
$Od_2SnO_4$ by spray pyrolysis
$SnO_2$: F by CVD
TiN by CVD
ZnO: In by spray pyrolysis
ZnO: Al by sputtering
ZnO: In by sputtering
ZnO: B by CVD
ZnO: Ga by sputtering
ZnO: F by CVD
ZnO: A by CVD
ZnO: Ga by CVD
ZnO: In by CVD
$Zn_2ShO_4$ by sputtering
$ZnSnO_3$ by sputtering
$Cd_2SnO_4$ by pulsed laser deposition Table 4 has been excerpted from an article entitled "Criteria for Choosing Transparent Conductors" by Roy G. Gordon, which was published on Pages 52-57 of the MRS Bulletin of August 2000 and was called "Table 1" therein. The material referred to herein as indium tin oxide (ITO) in the present invention is listed in Table 4 as $In_2O_3$:Sn.

Since the original publication of the information set forth in Table 4 in the MRS Bulletin of August 2000, substantial work has been done to invent, develop and commercialize other materials for use as transparent conductors, notably films comprising carbon nanotubes.

Although, because of its commercial availability, ITO has been used as the transparent conductive (electrode) material in the SPD devices described herein, it should be appreciated that any alternative transparent conductors, such as but not limited to the other materials listed or mentioned herein, could be substituted for ITO in the present invention and would nevertheless be expected to work usefully. After being overcoated with the overcoatings of the present invention, said overcoatings can be expected to provide good adhesion to the cured SPD emulsion in an SPD film comparable to the adhesion described in the Examples described herein.

In general, for purposes of the present invention, although an overcoating as thick as 50,000 Angstroms could be used, in order to avoid excessive light absorption by the overcoating, an overcoating thickness of 10,000 Angstroms or less is preferred, although a thickness of 1,000 Angstroms or less is more preferred, and an overcoating thickness of 100 Angstroms or less is most preferred. A minimum overcoating thickness of 10 Angstroms is recommended for small area substrates in order to achieve reasonable uniformity of the overcoating thickness over each underlying transparent conductive coating (i.e., the electrode).

In order to save coating expense while achieving a relatively uniform over a large area such as 1 meter squared or more and simultaneously preventing arc-over short circuits, it is recommended that one overcoating on one electrode be at least 25 Angstroms thick and the overcoating on the second electrode be at least 50 Angstroms thick. In some instances the thicknesses of the two overcoatings may differ.

What is claimed is:

1. An electro-optical device for controlling the transmission of radiation, said device comprising a cell formed of opposed cell walls, a light-modulating element between the cell walls and opposed electrode means operatively associated with the cell walls, said light modulating element comprising a film formed of a matrix polymer material having droplets of liquid light valve suspension comprising a plurality of particles dispersed in a liquid suspending medium distributed within the matrix, wherein said device is provided with at least one layer of an overcoating on at least a portion of a surface between the electrode means and the light modulating element, said overcoating formed from a material comprising a member selected from the group consisting of (a) titanium dioxide ($TiO_2$) alone and (b) a combination of $SiO_x$ and an inorganic material having an index of refraction at 589 nm greater than 1.54.

2. The electro-optical device according to claim 1, wherein the refractive index of said inorganic material at 589 nm is greater than 1.80.

3. The electro-optical device according to claim 1, wherein the value of (X) ranges between about 1.6 and 2.0.

4. The electro-optical device according to claim 1, wherein said film is a polyorganosiloxane film.

5. The electro-optical device according to claim 1, wherein the film is a cross-linked film.

6. The electro-optical device according to claim 5 wherein the film comprises approximately 2-6% by weight of a cross-linkable monomer.

7. The electro-optical device according to claim 6, wherein the cross-linkable monomer is (3-acryloxypropyl)methyldimethoxy silane.

8. The electro-optical device according to claim 7, wherein at least one methoxy group of said (3-acryloxypropyl)methyldimethoxy silane monomer is hydrolyzed.

9. The electro-optical device according to claim 1, wherein substantially an entire space between the electrode means and the light modulating element is provided with said overcoating.

10. The electro-optical device according to claim 1, wherein said film comprises, in order:
   (a) a first sheet of polyethylene terephthalate plastic;
   (b) a first substantially transparent coating of indium tin oxide upon at least a portion of a surface of said first sheet of polyethylene terephthalate plastic;
   (c) a layer of cured SPD emulsion;
   (d) a second substantially transparent coating of indium tin oxide upon at least a portion of a surface of a second sheet of polyethylene terephthalate plastic; and
   (e) a second sheet of polyethylene terephthalate plastic.

11. A method of making an electro-optical device for controlling the transmission of radiation, said device comprising a cell formed of opposed cell walls, a light-modulating element between the cell walls and opposed electrode means operatively associated with the cell walls, said light modulating element comprising a film formed of a matrix polymer material having droplets of liquid light valve suspension comprising a plurality of particles dispersed in a liquid suspending medium distributed within the matrix, wherein said method comprises
   providing at least one layer of an overcoating on at least a portion of a surface between the electrode means and the light modulating element, said overcoating formed from a material comprising a member selected from the group consisting of (a) titanium dioxide ($TiO_2$) alone and (b) a combination of $SiO_x$ and an inorganic material having an index of refraction at 589 nm greater than 1.54.

12. The method according to claim 11, wherein the refractive index of said inorganic material at 589 nm is greater than 1.80.

13. The method according to claim 11, wherein the value of (X) ranges between about 1.6 and 2.0.

14. The method according to claim 11, wherein said film is a polyorganosiloxane film.

15. The method according to claim 11, wherein the film is a cross-linked film.

16. The method according to claim 11, which further comprises incorporating in said film approximately 2-6% by weight of a cross-linkable monomer.

17. The method according to claim 16, wherein the cross-linkable monomer is (3-acryloxypropyl)methyldimethoxy silane.

18. The method according to claim 17, wherein at least one methoxy group of said (3-acryloxypropyl)methyldimethoxy silane is hydrolyzed.

19. The method according to claim 11, wherein substantially an entire space between the electrode means and the light-modulating element is provided with said overcoating.

20. The method according to claim 11, wherein said film comprises, in order:
(a) a first sheet of polyethylene terephthalate plastic;
(b) a first substantially transparent coating of indium tin oxide upon at least a portion of a surface of said first sheet of polyethylene terephthalate plastic;
(c) a layer of cured SPD emulsion;
(d) a second substantially transparent coating of indium tin oxide upon at least a portion of a surface of a second sheet of polyethylene terephthalate plastic; and
(e) a second sheet of polyethylene terephthalate plastic.

* * * * *